United States Patent
Lin et al.

(10) Patent No.: US 12,457,438 B2
(45) Date of Patent: Oct. 28, 2025

(54) TIME SEQUENCE INFORMATION CONFIGURATION METHOD AND RELATED APPARATUS

(71) Applicant: Huawei Technologies Co., Ltd., Shenzhen (CN)

(72) Inventors: Huafeng Lin, Dongguan (CN); Yuanmou Li, Dongguan (CN); Weihua Wang, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 267 days.

(21) Appl. No.: 18/323,802

(22) Filed: May 25, 2023

(65) Prior Publication Data

US 2023/0319448 A1   Oct. 5, 2023

Related U.S. Application Data

(63) Continuation of application No. PCT/CN2021/123972, filed on Oct. 15, 2021.

(30) Foreign Application Priority Data

Nov. 26, 2020   (CN) .......................... 202011352945.1

(51) Int. Cl.
*H04Q 11/00* (2006.01)

(52) U.S. Cl.
CPC . *H04Q 11/0067* (2013.01); *H04Q 2011/0088* (2013.01)

(58) Field of Classification Search
CPC .................... H04Q 11/0067; H04Q 2011/0088

USPC ........................................................... 398/66
See application file for complete search history.

(56) References Cited

U.S. PATENT DOCUMENTS

| | | | |
|---|---|---|---|
| 9,768,905 B2* | 9/2017 | Wu | H04J 14/0252 |
| 11,146,335 B1* | 10/2021 | Zhong | H04B 10/40 |
| 2012/0251113 A1* | 10/2012 | Hajduczenia | H04L 41/082 398/66 |
| 2017/0054719 A1* | 2/2017 | Zheng | H04L 63/0876 |
| 2017/0117960 A1* | 4/2017 | Peng | H04L 41/0806 |
| 2017/0187632 A1* | 6/2017 | Ko | H04L 43/0876 |
| 2019/0089478 A1* | 3/2019 | Effenberger | H04B 10/25753 |
| 2019/0349086 A1* | 11/2019 | Apetrei | H04Q 11/0067 |
| 2020/0044733 A1* | 2/2020 | Soto | H04J 14/0252 |
| 2022/0158750 A1* | 5/2022 | Fludger | H04B 10/532 |
| 2023/0396333 A1* | 12/2023 | Huang | H04B 10/2725 |

FOREIGN PATENT DOCUMENTS

| | | |
|---|---|---|
| CN | 107529100 A | 12/2017 |
| EP | 4224881 A1 | 8/2023 |
| WO | 2022068928 A1 | 4/2022 |

* cited by examiner

*Primary Examiner* — Dalzid E Singh
(74) *Attorney, Agent, or Firm* — Slater Matsil, LLP

(57) ABSTRACT

An OLT performs interactive authentication with an optical module, and determines a time sequence parameter of the optical module. The optical module stores the time sequence parameter in a register of the optical module. When the optical module is inserted into the OLT and is in a working state, the OLT reads the time sequence parameter stored in the optical module. Then, based on the time sequence parameter, the OLT determines and configures time sequence information of an ONU corresponding to the optical module.

18 Claims, 5 Drawing Sheets

TIME SEQUENCE INFORMATION CONFIGURATION METHOD AND RELATED APPARATUS

CROSS-REFERENCE TO RELATED APPLICATIONS

This application is a continuation of International Application No. PCT/CN2021/123972, filed on Oct. 15, 2021, which claims priority to Chinese Patent Application No. 202011352945.1, filed on Nov. 26, 2020. The disclosures of the aforementioned applications are hereby incorporated by reference in their entireties.

TECHNICAL FIELD

This application relates to the communication field, and in particular, to a time sequence information configuration method and a related apparatus.

BACKGROUND

For optical fiber access currently used in homes, a manner of a passive optical network (PON) is mainstream, and a main function of the PON is: In upstream, data is transmitted in a time division multiple access (TDMA) manner. After an optical network unit (ONU) is successfully registered, an optical line termination (OLT) allocates a particular slot to the ONU based on a system configuration to perform data transmission. The ONU sends data in sequence based on the allocated slot, to avoid an upstream data conflict. A specific process thereof may be shown in FIG. 1. In a scenario in which a plurality of ONUs correspond to one OLT, an ONU 1, an ONU 2, and an ONU 3 separately obtain a slot. The ONU 1 sends data 1 in a slot 1, the ONU 2 sends data 2 in a slot 2, and the ONU 3 sends data 3 in a slot 3. Then, the OLT receives the data 1 to the data 3 based on a sequence of the slots. In a downstream direction, a broadcast mode is used. All the ONUs can receive same data. On the OLT, a downstream data flow is encapsulated into an Ethernet packet, and a corresponding identity (ID) is attached. At an optical splitter, the downstream data flow is split into a plurality of same flows and broadcast to each branch. After receiving the data sent by the OLT, the ONU determines whether to process or discard the data flow based on the ID. A specific process thereof may be shown in FIG. 2.

In the PON system, to resolve an upstream burst problem, the OLT usually needs to determine, based on a burst data recovery function of an optical module, a capability of media access control (MAC) service continuity and burst clock data recovery (BCDR), whether a reset is required for burst reception, and a quantity of required resets, key time sequence information such as burst overhead data, a preamble (Preamble) length, and a reset signal location that meet system specification requirements. The OLT implements orderly cooperation between the OLT/MAC and the optical module based on time sequence configuration information, to efficiently receive and recover upstream burst data.

Therefore, to control the optical module to perform, in an upstream burst state, normal data exchange of the system, time sequence information adaptation between the OLT and the optical module is critical. Currently, the OLT can store only fixed time sequence information. Therefore, when a time sequence required by the optical module changes or time sequence information of the optical module significantly changes in subsequent development, the time sequence information adaptation between the OLT and the optical module cannot be implemented.

SUMMARY

Embodiments of this application provide a time sequence information configuration method and a related apparatus, to resolve a problem of time sequence information adaptation between an OLT and an optical module.

According to a first aspect, an embodiment of this application provides a time sequence information configuration method. The method is specifically as follows: An OLT performs interactive authentication with an optical module, and then determines a time sequence parameter of the optical module. The optical module then stores the time sequence parameter in a register of the optical module. When the optical module is inserted into the OLT and is in a working state, the OLT reads the time sequence parameter stored in the optical module. Then, the OLT determines, based on the time sequence parameter, time sequence information of an ONU corresponding to the optical module. Finally, the OLT configures the time sequence information for the ONU.

In this embodiment, the time sequence parameter may be time sequence information corresponding to the optical module. Alternatively, time sequence information corresponding to the optical module may be determined based on a time sequence coefficient stored in the OLT. To be specific, when the optical module performs interactive authentication with the OLT, the time sequence information corresponding to the optical module may be determined, and then the time sequence information is stored in the optical module as the time sequence parameter. Alternatively, when the optical module performs interactive authentication with the OLT, the time sequence information of the optical module is determined; and at the same time, the OLT converts time sequence information stored in the OLT into a time sequence coefficient, and then determines the time sequence parameter of the optical module based on the time sequence coefficient and the time sequence information of the optical module. For example, when a preamble in the time sequence information of the optical module is 100 nanoseconds, and the time sequence coefficient stored in the OLT is 5, the time sequence parameter stored in the optical module is 20 nanoseconds.

In this embodiment, the optical module performs interactive authentication with the OLT to determine the time sequence parameter corresponding to the optical module, and then the OLT determines time sequence information corresponding to each optical module by using the time sequence parameter as a variable. In this way, for different optical modules, the OLT device can flexibly implement time sequence information adaptation between the OLT and the optical module without modifying the time sequence information stored in the OLT device.

Optionally, the time sequence parameter is stored in a register address agreed upon by the optical module and the OLT in a protocol. In this way, it may be convenient for the OLT to read the time sequence parameter.

Optionally, the OLT may read the time sequence parameter stored in the optical module through a management channel between the optical module and the OLT.

Optionally, the time sequence information includes burst total overhead data, a preamble Preamble length, and a reset Reset signal location.

Optionally, after the OLT configures the time sequence information for the ONU, the OLT may perform normal data exchange with the ONU based on the time sequence information.

According to a second aspect, an embodiment of this application provides a time sequence information configuration method. The method specifically includes: An optical module performs interactive authentication with an OLT to determine a time sequence parameter, and then stores the time sequence parameter in a register of the optical module. When the optical module is inserted into the OLT and is in a working state, the OLT reads the time sequence parameter stored in the optical module. Then, the OLT determines, based on the time sequence parameter, time sequence information of an ONU corresponding to the optical module. Finally, the OLT configures the time sequence information for the ONU.

In this embodiment, the time sequence parameter may be time sequence information corresponding to the optical module. Alternatively, time sequence information corresponding to the optical module may be determined based on a time sequence coefficient stored in the OLT. To be specific, when the optical module performs interactive authentication with the OLT, the time sequence information corresponding to the optical module may be determined, and then the time sequence information is stored in the optical module as the time sequence parameter. Alternatively, when the optical module performs interactive authentication with the OLT, the time sequence information of the optical module is determined; and at the same time, the OLT converts time sequence information stored in the OLT into a time sequence coefficient, and then determines the time sequence parameter of the optical module based on the time sequence coefficient and the time sequence information of the optical module. For example, when a preamble in the time sequence information of the optical module is 100 nanoseconds, and the time sequence coefficient stored in the OLT is 5, the time sequence parameter stored in the optical module is 20 nanoseconds.

In this embodiment, the optical module performs interactive authentication with the OLT to determine the time sequence parameter corresponding to the optical module, and then the OLT determines time sequence information corresponding to each optical module by using the time sequence parameter as a variable. In this way, for different optical modules, the OLT device can flexibly implement time sequence information adaptation between the OLT and the optical module without modifying the time sequence information stored in the OLT device.

Optionally, the time sequence information includes burst total overhead data, a preamble Preamble length, and a reset Reset signal location.

Optionally, that the optical module responds to a read instruction of the OLT, and transmits the time sequence parameter to the OLT specifically includes: The optical module responds to the read instruction of the OLT, and transmits the time sequence parameter to the OLT through a management channel.

According to a third aspect, this application provides an optical line termination apparatus. The apparatus has a function of implementing behavior of the OLT in the first aspect. The function may be implemented by hardware, or may be implemented by executing corresponding software by hardware. The hardware or the software includes one or more modules corresponding to the function.

In a possible implementation, the apparatus includes units or modules configured to perform the steps according to the first aspect. For example, the apparatus includes: a reading unit, configured to read a time sequence parameter stored in an optical unit; a processing unit, configured to determine, based on the time sequence parameter, time sequence information corresponding to the optical module; and a configuration unit, configured to configure the time sequence information for an optical network unit ONU corresponding to the optical module.

In a possible implementation, the apparatus includes a processor and a transceiver. The processor is configured to support the OLT in performing a corresponding function in the method provided in the first aspect. The transceiver is configured to indicate the OLT to communicate with the optical module and the ONU, send interaction data in the foregoing method to the ONU, and send a read instruction to the optical module. Optionally, the apparatus may further include a memory. The memory is configured to be coupled to the processor, and the memory stores program instructions and data that are necessary for the OLT, for example, stores a fixed time sequence coefficient.

In a possible implementation, when the apparatus is a chip in the OLT, the chip includes a processing unit and a transceiver unit. The transceiver unit may be, for example, an input/output interface, a pin, or a circuit on the chip, and transmits the read instruction or the time sequence information to another chip or module coupled to the chip. The processing unit may be, for example, a processor. The processor is configured to determine, based on the time sequence parameter, the time sequence information corresponding to the optical module. The processing unit may execute computer execution instructions stored in a storage unit, to support the OLT in performing the method provided in the first aspect. Optionally, the storage unit may be a storage unit in the chip, for example, a register or a cache. The storage unit may alternatively be a storage unit, for example, a read-only memory (read-only memory, ROM), another type of static storage device that can store static information and instructions, or a random access memory (RAM), that is outside the chip.

In a possible implementation, the apparatus includes a communication interface and a logic circuit. The communication interface is configured to read the time sequence parameter stored in the optical unit. The logic circuit is configured to determine, based on the time sequence parameter, the time sequence information corresponding to the optical module. The communication interface is further configured to configure the time sequence information for the optical network unit ONU corresponding to the optical module.

Any processor mentioned above may be a general-purpose central processing unit (CPU), a microprocessor, an application-specific integrated circuit (ASIC), or one or more integrated circuits configured to control program execution of the time sequence information configuration methods according to the foregoing aspects.

According to a fourth aspect, an embodiment of this application provides an optical module apparatus. The apparatus has a function of implementing behavior of the optical module in the second aspect. The function may be implemented by hardware, or may be implemented by executing corresponding software by hardware. The hardware or the software includes one or more modules corresponding to the function.

In a possible implementation, the apparatus includes units or modules configured to perform the steps according to the second aspect. For example, the apparatus includes: an interactive authentication unit, configured to perform interactive authentication with an optical line termination OLT to determine a time sequence parameter; a storage unit, configured to store the time sequence parameter in a register of the optical module apparatus; a receiving unit, configured to receive a read instruction of the OLT when the apparatus is inserted into the OLT and is a working state; and a responding unit, configured to respond to the read instruction of the OLT, so that the OLT reads the time sequence parameter and performs, based on the time sequence parameter, data exchange with an optical network unit ONU corresponding to the optical module.

In a possible implementation, the apparatus includes a processor, a transceiver, and a memory. The processor is configured to support the optical module in performing a corresponding function in the method provided in the second aspect. The transceiver is configured to indicate the optical module to communicate with the OLT and the ONU, receive a read instruction sent by the OLT, and respond to the read instruction. The memory is configured to be coupled to the processor, and the memory stores program instructions and data that are necessary for the optical module, for example, stores the time sequence parameter.

In a possible implementation, when the apparatus is a chip in the optical module, the chip includes a processing unit, a transceiver unit, and a storage unit. The transceiver unit may be, for example, an input/output interface, a pin, or a circuit on the chip. The transceiver unit receives the read instruction, responds to the read instruction, and transmits the time sequence parameter to another chip or module coupled to the chip. The processing unit may be, for example, a processor. The processor is configured to determine, based on the time sequence parameter, time sequence information corresponding to the optical module. The processing unit may execute computer execution instructions stored in the storage unit, to support the optical module in performing the method provided in the second aspect. The storage unit may be a storage unit in the chip, for example, a register or a cache. The storage unit may alternatively be a storage unit, for example, a read-only memory (ROM), another type of static storage device that can store static information and instructions, or a random access memory (RAM), that is outside the chip.

In a possible implementation, the apparatus includes a communication interface and a logic circuit. The communication interface is configured to perform interactive authentication with an optical line termination OLT to determine a time sequence parameter. The logic circuit is configured to store the time sequence parameter in a register of the optical module apparatus. The communication interface is further configured to receive a read instruction of the OLT when the apparatus is inserted into the OLT and is in a working state; and respond to the read instruction of the OLT, and transmit the time sequence parameter to the OLT.

Any processor mentioned above may be a general-purpose central processing unit (CPU), a microprocessor, an application-specific integrated circuit (ASIC), or one or more integrated circuits configured to control program execution of the time sequence information configuration methods according to the foregoing aspects.

According to a fifth aspect, an embodiment of this application provides a computer-readable storage medium. The computer storage medium stores computer instructions, and the computer instructions are used to perform the method according to any possible implementation of any one of the foregoing aspects.

According to a sixth aspect, an embodiment of this application provides a computer program product including instructions. When the computer program product runs on a computer, the computer is enabled to perform the method according to any one of the foregoing aspects.

According to a seventh aspect, this application provides a chip system. The chip system includes a processor, configured to support a communication apparatus in implementing a function in the foregoing aspects, for example, generating or processing data and/or information in the foregoing methods. In a possible design, the chip system further includes a memory. The memory is configured to store program instructions and data that are necessary for the communication apparatus, to implement a function in any one of the foregoing aspects. The chip system may include a chip, or may include a chip and another discrete component.

In a possible implementation, when running on a side of an OLT, the chip system may support the OLT in performing the method provided in the first aspect.

In another possible implementation, when running on an optical module, the chip system may support the optical module in performing the method provided in the second aspect.

According to an eighth aspect, an embodiment of this application provides a communication system. The system includes the optical module, the OLT, and the ONU according to the foregoing aspects.

DETAILED DESCRIPTION OF ILLUSTRATIVE EMBODIMENTS

Figure 1:
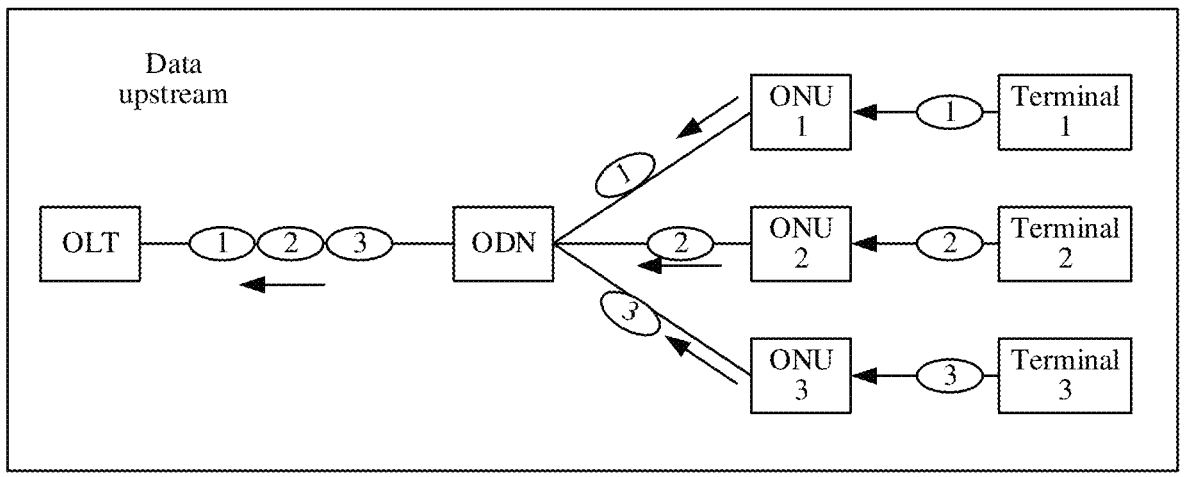
FIG. 1 is a schematic diagram of sending upstream data in a PON access system.

To make objectives, technical solutions, and advantages of this application clearer, the following describes embodiments of this application with reference to the accompanying drawings. It is clear that the described embodiments are merely some but not all of embodiments of this application. Persons of ordinary skill in the art may learn that, as a new application scenario emerges, the technical solutions provided in embodiments of this application are also applicable to a similar technical problem.

In the specification, claims, and accompanying drawings of this application, the terms "first", "second", and the like are used to distinguish between similar objects, but do not necessarily indicate a specific order or sequence. It should be understood that the data used in such a way are interchangeable under proper circumstances so that embodiments described herein can be implemented in other orders than the order illustrated or described herein. In addition, the terms "include", "have" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, product, or device. Names or numbers of steps in this application do not mean that the steps in the method procedure need to be performed in a time/logical sequence indicated by the names or numbers. An execution sequence of the named or numbered steps in the procedure can be changed based on a technical objective to be achieved, provided that same or similar technical effects can be achieved. Division into units in this application is logical division. During actual application, there may be another division manner. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electrical or other similar forms. This is not limited in this application. In addition, units or subunits described as separate parts may or may not be physically separate, may or may not be physical units, or may be distributed into a plurality of circuit units. Some or all of the units may be selected based on actual requirements to achieve the objectives of the solutions of this application. Terms in this application are used only for the purpose of describing specific embodiments, but are not intended to limit this application. The singular expressions "one", "a", "an" and "this" of singular forms used in this specification and the appended claims of this application are also intended to include expressions such as "one or more", unless otherwise specified in the context clearly. It should be further understood that, in embodiments of this application, "one or more" refers to one, two, or more, and the term "and/or" describes an association between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects.

Figure 2:
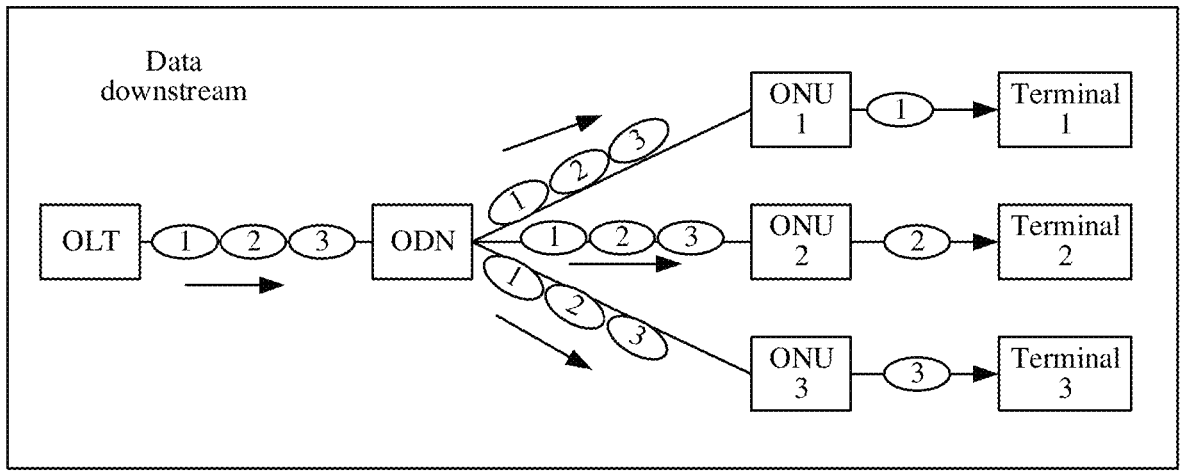
FIG. 2 is a schematic diagram of sending downstream data in a PON access system.

For ease of understanding, a PON access system in a conventional technology is first described. A PON technology is a point-to-multipoint optical fiber access technology. The PON system may include an OLT, an optical distribution network (optical distribution network, ODN), and at least one ONU. The OLT is connected to a plurality of ONUs through the ODN. As shown in FIG. 1 and FIG. 2, a structure of a PON access system includes three parts: an OLT, an ODN, and an ONU. The OLT is a convergence device of an PON protocol at a central office. The ODN is a passive device that connects the OLT and the ONU, distributes downstream data and centralizes upstream data. In the PON access system, the ONU may be configured to provide a user-side interface or may directly provide a user port function. If the ONU directly provides the user port function, the ONU is referred to as an optical network terminal (ONT). Therefore, for ease of understanding, the ONU mentioned below refers to the ONT that can directly provide the user port function and the ONU that provides the user-side interface. In the current PON access system, in upstream, data is transmitted in a TDMA manner. In other words, after the ONU is successfully registered, the OLT allocates, based on a system configuration, a specific slot to the ONU for data transmission. The ONU sends data in sequence based on the allocated slot, and this avoids an upstream data conflict. A specific process thereof may be shown in FIG. 1. The OLT allocates corresponding slots to an ONU 1, an ONU 2, and an ONU 3. The ONU 1 sends data 1 in a slot 1, the ONU 2 sends data 2 in a slot 2, and the ONU 3 sends data 3 in a slot 3. Then, the OLT receives the data 1 to the data 3 based on a sequence of the slots. In a downstream direction, the OLT sends data in a broadcast manner, in other words, all ONUs can receive the same data. On the OLT, a downstream data flow is encapsulated into an Ethernet packet, and a corresponding ID is attached. The ID indicates an ONU to which the packet belongs. At an optical splitter, the packet is split into three sets of signals and broadcast to each branch. After receiving the data sent by the OLT, the ONU determines whether to process or discard the data flow based on the ID. A specific process thereof may be shown in FIG. 2. The OLT needs to send data packets to three ONUs (for example, the ONU 1 to the ONU 3), and IDs respectively indicate that a data packet 1 corresponds to the ONU 1, a data packet 2 corresponds to the ONU 2, and a data packet 3 corresponds to the ONU 3. Then, at the optical splitter, data including the data packet 1 to the data packet 3 is split into three sets of signals and broadcast to each branch. Then, the ONU determines, based on the ID, the data packet corresponding to the ONU, receives the data packet corresponding to the ONU, and then discards other data packets. For example, the ONU 1 receives the data packet 1 and discards the data packet 2 and the data packet 3, and the ONU 2 receives the data packet 2 and discards the data packet 1 and the data packet 3.

Figure 3:
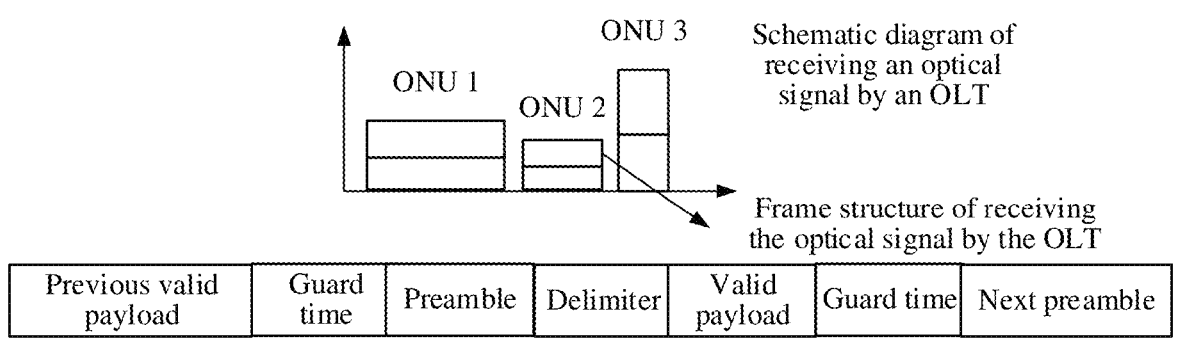
FIG. 3 is a schematic diagram of a data format of an upstream data packet of an ONU.
Figure 4:
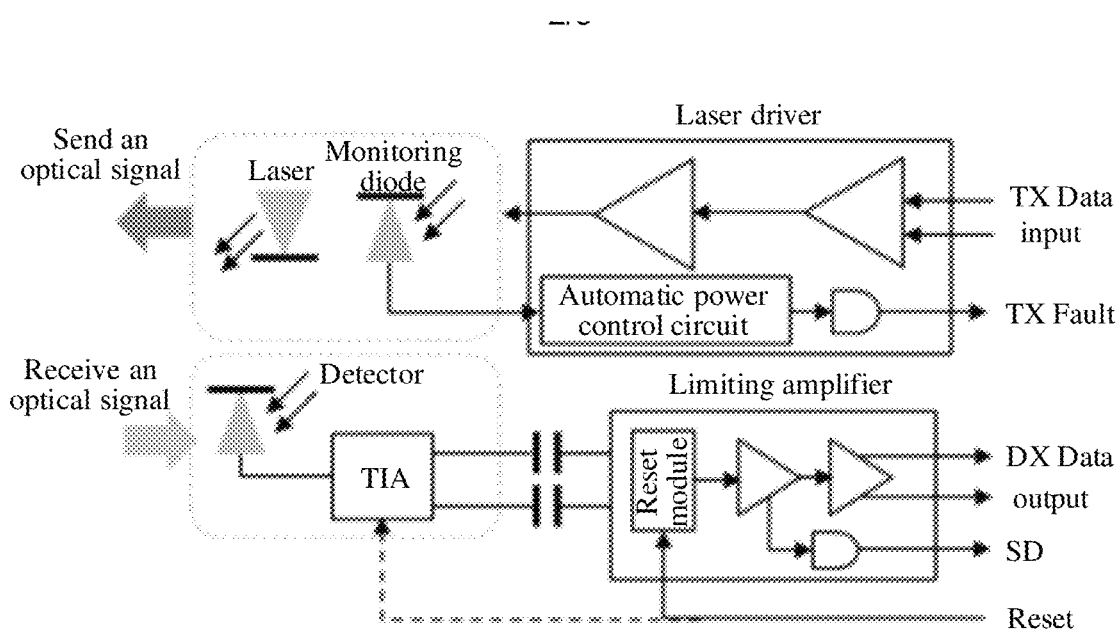
FIG. 4 is a schematic diagram of a structure of an optical module according to an embodiment of this application.

It can be learned from the foregoing solution that, from a perspective of an entire system design, there is only one signal source, that is, the OLT, in the downstream direction, and the ONU receives a broadcast frame. For a specific ONU, a receive path remains unchanged, and a received signal level and a phase characteristic of the ONU are relatively stable. Therefore, a problem of burst reception does not occur. However, in the upstream direction, there are a plurality of signal sources (ONUs) for the OLT. Different distances between the ONUs and the OLT and differences in link characteristics result in same transmit power of the ONUs but different receive power of the OLT. Therefore, a receiver at an OLT end needs to support burst reception. In addition, from a perspective of entire system optimization, the ONU is required to be in an off state when no signal is transmitted, and is required to be turned on quickly when a signal is transmitted. Therefore, the ONU needs to support a burst transmission mode. Therefore, a format of an upstream data packet of the ONU may be shown in FIG. 3. To be specific, total overheads of upstream burst reception include guard time, a preamble, a delimiter, and a valid payload. The guard time includes light off time (Turn off), light on time (Turn on), post-drifting time of previous burst light, pre-drifting time of current burst light, and reset time. However, to support burst reception, the OLT needs to cooperate with a burst receiver (that is, an OLT optical module). The OLT optical module (for ease of understanding, all of the following optical modules refer to the OLT optical module), as a core component for implementing burst reception, is mainly configured to implement optical-to-electrical or electrical-to-optical conversion. The OLT optical module mainly includes a receiving part and a transmitting part. The receiving part implements the optical-to-electrical conversion, and the transmitting part implements the electrical-to-optical conversion. A structure of the optical module may be shown in FIG. 4. Functions of each functional unit are as follows:

A laser is a component that converts an electrical signal into an optical signal.

A monitoring diode receives optical power of the laser, monitors a current of the laser, and controls output optical power of the laser in cooperation with an automatic power control circuit.

A laser driver is configured to drive and control work of the laser, mainly converts an input electrical signal into a laser drive signal, and controls the laser to work normally.

A detector is configured to receive an optical signal and convert the optical signal into a current signal.

A trans-impedance amplifier (trans-impedance amplifier, TIA) is configured to amplify a current signal output by a photodetector and convert the current signal into a voltage signal for output.

A limiting amplifier mainly amplifies the voltage signal output by the TIA and converts the signal into a standard digital level signal.

Figure 5:
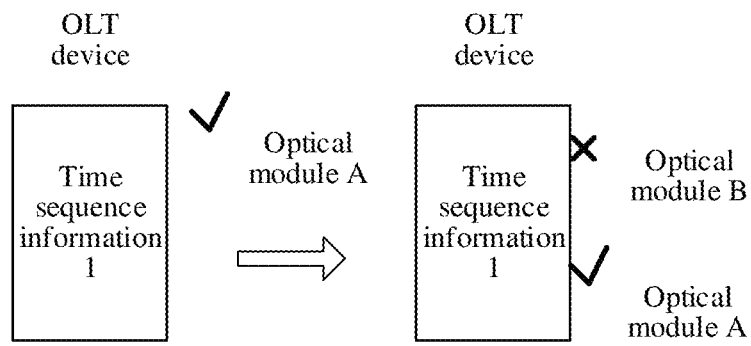
FIG. 5 is a schematic flowchart of an OLT time sequence configuration manner.

Based on a function of the optical module, the OLT needs to learn of a plurality of types of information related to the optical module to determine time sequence information that meets system specification requirements. The information related to the optical module includes but is not limited to one or more of data recovery performance, a MAC BCDR capability, whether a reset is required for burst reception, and a quantity of required resets. The time sequence information includes but is not limited to one or more of burst overhead data, a preamble length, a reset signal location. System specifications refer to parameters that the OLT needs to meet in the PON access system. For example, a specific delay requirement needs to be met. The OLT implements orderly cooperation between the OLT and the optical module based on the time sequence information, to efficiently receive and recover upstream burst data. Currently, to implement the orderly cooperation between the OLT and the optical module, a time sequence mapping table is usually preconfigured for the OLT (the time sequence mapping table includes a time sequence number and time sequence information corresponding to the time sequence number. For example, if the time sequence number is 1, the corresponding sequence information is A. If the time sequence number is 2, the corresponding time sequence information is B). In an optical module processing process, a time sequence number corresponding to the optical module is preconfigured. When the optical module is inserted into the OLT for use, the OLT reads the time sequence number inside the optical module, searches the time sequence mapping table for the time sequence number, and configures a board register corresponding to the optical module based on the time sequence information in the time sequence mapping table. In an example implementation shown in FIG. 5, the time sequence mapping table preconfigured in the OLT device includes time sequence information 1, the time sequence information 1 adapts to an optical module A, and a system joint commissioning test is completed. To ensure that the OLT device and the optical module can work normally, all other optical modules introduced subsequently need to completely match the time sequence information 1. If a subsequent optical module B uses a different working mode and is not compatible with the time sequence information 1, the optical module B cannot be used.

For ease of understanding, the following describes a relationship between a time sequence number, time sequence information, a time sequence parameter, and a time sequence coefficient.

Time sequence information: In this application document, the time sequence information is information used to implement normal data exchange between the optical module, the OLT, and the ONU, and includes but is not limited to burst total overheads, a preamble length, and a reset signal location.

Time sequence number: In the time sequence mapping table preconfigured in the OLT, the time sequence number and the time sequence information are in a one-to-one correspondence. In an example solution, the relationship between the time sequence number and the time sequence information may be shown in Table 1.

TABLE 1

| Time sequence number | Time sequence information |
|---|---|
| 1 | Burst total overheads A1, preamble length A1, . . . |
| 2 | Burst total overheads B1, preamble length B1, . . . |

Time sequence coefficient: In this application document, the time sequence coefficient is a fixed parameter preconfigured in the OLT.

Time sequence parameter: In this application document, the time sequence parameter is preconfigured in the register of the optical module. The time sequence parameter may be time sequence information corresponding to the optical module, or may be an intermediate value of information about obtaining a time sequence. When the time sequence parameter is the intermediate value, the OLT may determine, based on the time sequence coefficient preconfigured in the OLT and the time sequence parameter preconfigured in the optical module, the time sequence information corresponding to the optical module. For example, in the time sequence information corresponding to the optical module, burst total overhead data is 100 nanoseconds, and the time sequence coefficient stored in the OLT is 4. In this case, a parameter that is in the time sequence parameter and that indicates the burst total overhead data may be 25 nanoseconds.

Therefore, to resolve the problem in the foregoing solution and implement that the OLT can flexibly adapt to optical modules with different time sequence requirements, embodiments of this application provide a time sequence information configuration method and a related apparatus.

The following describes the time sequence information configuration method in this application with reference to specific embodiments.

Figure 6:
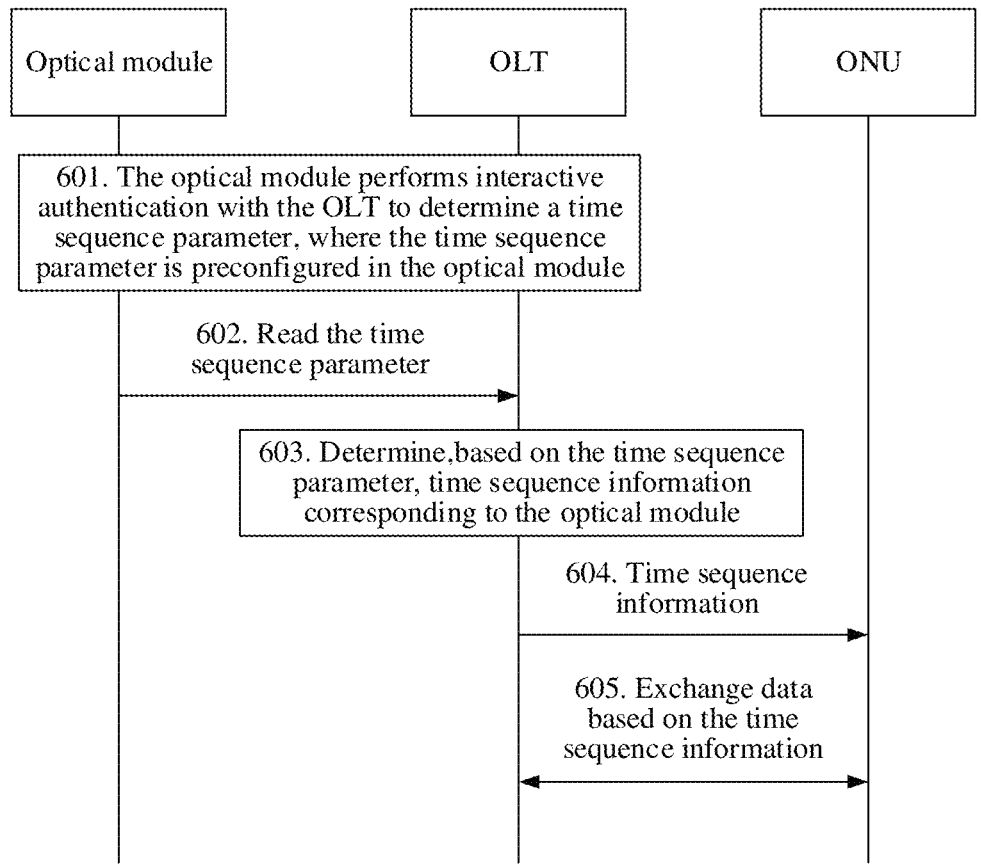
FIG. 6 is a schematic diagram of an embodiment of a time sequence information configuration method according to an embodiment of this application.

FIG. 6 shows a time sequence information configuration method according to an embodiment of this application. An OLT and an optical module are used for description in the following embodiments.

601. The optical module performs interactive authentication with the OLT to determine a time sequence parameter corresponding to the optical module, where the time sequence parameter is preconfigured in the optical module.

In a research and development stage of the optical module, the optical module performs interactive authentication with the OLT, so that the time sequence parameter of the optical module during work of the optical module is determined. Then, the optical module writes the time sequence parameter into a register address that is pre-agreed upon with the OLT, and the register address is located in the optical module. In an example solution, the time sequence parameter may be shown in Table 2.

TABLE 2

| Optical module | Burst reception total overheads | Preamble length | Reset signal location |
|---|---|---|---|
| A | XX | XX | XX |

It may be understood that only some information about the time sequence parameter is shown above, and specific content may be configured based on an actual situation. In addition, a counting unit of information such as the burst reception total overheads, the preamble length, and the reset signal location may be configured based on the actual situation. For example, the counting unit is configured as nanosecond or is a default unit. This is not specifically limited herein.

In this embodiment of this application, the time sequence parameter in the research and development stage of the optical module may be directly used time sequence information, or may be a time sequence parameter obtained based on a time sequence coefficient stored in the OLT. The time sequence coefficient is a fixed parameter stored in the OLT. In the latter case, the OLT may store a fixed time sequence coefficient in the OLT. When the optical module is inserted into the OLT and works, the OLT may determine, based on the time sequence coefficient stored in the OLT and the time sequence parameter stored in the optical module, time sequence information during the work of the optical module. For example, the time sequence coefficient stored in the OLT is A, and each optical module obtains a time sequence parameter (for example, a time sequence parameter of an optical module 1 is B, and a time sequence parameter of an optical module 2 is C) after performing interactive authentication with the OLT. Then, when each optical module is inserted into the OLT and works, the OLT may obtain time sequence information of each optical module based on the coefficient and the time sequence parameter of each optical module. For example, time sequence information of the optical module 1 is A*B, and time sequence information of the optical module 2 is A*C.

602. The OLT reads the time sequence parameter when the optical module is inserted into the OLT and works.

When the optical module is inserted into the OLT and works, the OLT reads, from a register of the optical module through a management channel (for example, an inter-integrated circuit (inter-integrated circuit, IIC)), the time sequence parameter stored in the optical module.

603. The OLT determines, based on the time sequence parameter, time sequence information corresponding to the optical module.

604. The OLT configures the time sequence information for an ONU corresponding to the optical module.

The OLT sends the time sequence information to the ONU corresponding to the optical module, to notify the ONU that data may be sent and received based on the time sequence information.

605. The OLT exchanges data with the ONU based on the time sequence information.

Figure 7:
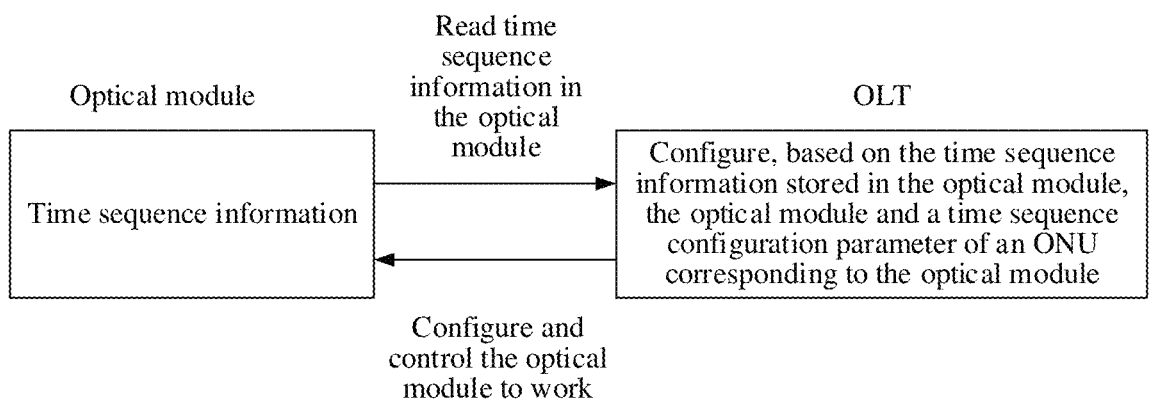
FIG. 7 is a schematic flowchart of time sequence information configuration according to an embodiment of this application.

A specific process thereof may be shown in FIG. 7. After the optical module is inserted into the OLT, the OLT reads, from the register of the optical module through the management channel, the time sequence information stored in the optical module, and then configures, based on the time sequence information stored in the optical module, the optical module and a time sequence configuration parameter of the ONU corresponding to the optical module. Finally, the OLT configures the time sequence configuration parameter for a MAC interface corresponding to the optical module and for the ONU, and finally controls the optical module to exchange data with the ONU.

Figure 8:
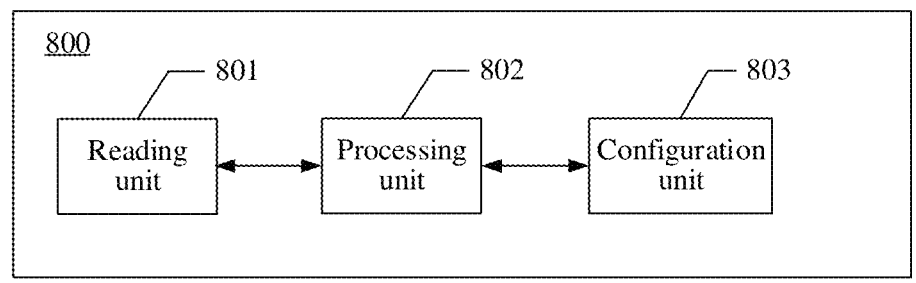
FIG. 8 is a schematic diagram of an embodiment of an optical line termination apparatus according to an embodiment of this application.

For details, refer to FIG. 8. In this embodiment of this application, an optical line termination apparatus 800 includes a reading unit 801, a processing unit 802, and a configuration unit 803, where the reading unit 801, the processing unit 802, and the configuration unit 803 are connected through a bus. The optical line termination apparatus 800 may be the OLT in the foregoing method embodiments, or may be configured as one or more chips in the OLT. The optical line termination apparatus 800 may be configured to perform some or all functions of the OLT in the foregoing method embodiments. In addition, FIG. 8 shows only some modules of the optical line termination apparatus that are related to this embodiment of this application.

For example, the reading unit 801 is configured to read a time sequence parameter stored in an optical unit. The processing unit 802 is configured to determine, based on the time sequence parameter, time sequence information corresponding to the optical module. The configuration unit 803 is configured to configure the time sequence information for the optical network unit ONU corresponding to the optical module.

Optionally, the optical line termination apparatus 800 further includes a storage unit, and the storage unit may store execution instructions. In this case, the storage unit is coupled to the processing unit 802, so that the processing unit 802 is enabled to execute the computer execution instructions stored in the storage unit, to implement a function of the OLT in the foregoing method embodiments. In an example, the storage unit optionally included in the optical line termination apparatus 800 may be a storage unit in a chip, for example, a register or a cache. The storage unit may alternatively be a storage unit, for example, a ROM, another type of static storage device that can store static information and instructions, or a RAM, that is outside the chip.

It should be understood that a procedure performed between modules of the OLT in the embodiment corresponding to FIG. 8 is similar to a procedure performed by the OLT in the method embodiments corresponding to FIG. 6 and FIG. 7. Details are not described herein again.

Figure 9:
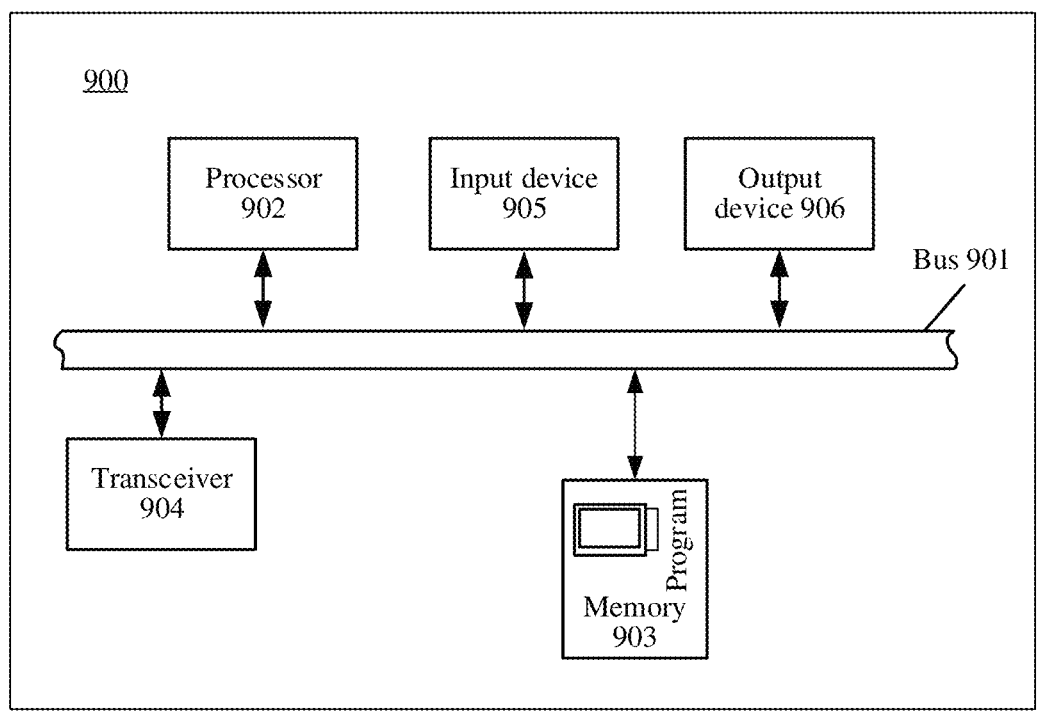
FIG. 9 is a schematic diagram of another embodiment of an optical line termination apparatus according to an embodiment of this application.

FIG. 9 is a schematic diagram of a possible structure of an optical line termination apparatus 900 in the foregoing embodiments. The optical line termination apparatus 900 may be configured as the foregoing OLT. The optical line termination apparatus 900 may include a processor 902, a computer-readable storage medium/memory 903, a transceiver 904, an input device 905, an output device 906, and a bus 901. The processor, the transceiver, the computer-readable storage medium, and the like are connected through the bus. A specific connection medium between the foregoing components is not limited in this embodiment of this application.

In an example, the transceiver 904 reads the time sequence parameter stored in the optical unit. The processor 902 determines, based on the time sequence parameter, the time sequence information corresponding to the optical module. The transceiver 904 sends the time sequence information to the optical network unit ONU corresponding to the optical module, to implement a function of configuring the time sequence information for the ONU.

The transceiver 904 and the processor 902 may implement corresponding steps in either of the embodiments in FIG. 6 and FIG. 7. Details are not described herein again.

It may be understood that FIG. 9 shows only a simplified design of the optical line termination apparatus. In actual application, the optical line termination apparatus may include any quantity of transceivers, processors, memories, and the like. All optical line termination apparatuses that can implement this application fall within the protection scope of this application.

The processor 902 in the apparatus 900 may be a general-purpose processor, for example, a CPU, a network processor (NP), or a microprocessor, or may be an ASIC, or one or more integrated circuits configured to control program execution of the solutions in this application. Alternatively, the processor 902 may be a digital signal processor (DSP), a field-programmable gate array (FPGA) or another programmable logic device, a discrete gate or a transistor logic device, or a discrete hardware component. Alternatively, a controller/processor may be a combination of processors implementing a computing function, for example, a combination of one or more microprocessors, or a combination of the DSP and the microprocessor. The processor usually performs logical and arithmetic operations based on program instructions stored in the memory.

The bus 901 described above may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

The computer-readable storage medium/memory 903 may further store an operating system and another application program. Specifically, the program may include program code, and the program code includes computer operation instructions. More specifically, the memory may be a ROM, another type of static storage device that can store static information and instructions, a RAM, another type of dynamic storage device that can store information and instructions, a magnetic disk memory, or the like. The memory 903 may be a combination of the foregoing storage types. In addition, the computer-readable storage medium/memory may be located in the processor, may be located outside the processor, or may be distributed in a plurality of entities including the processor or a processing circuit. The computer-readable storage medium/memory may be specifically embodied in a computer program product. For example, the computer program product may include a computer-readable medium in a packaging material.

Alternatively, embodiments of this application further provide a universal processing system. For example, the universal processing system is usually referred to as a chip. The universal processing system includes one or more microprocessors that provide a processor function, and an external memory that provides at least a part of the storage medium. All these components are connected to another supporting circuit by using an external bus architecture. When instructions stored in the memory are executed by the processor, the processor is enabled to perform some or all of the steps of the time sequence information configuration method performed by the optical line termination apparatus in the embodiments of FIG. 6 and FIG. 7, and/or another process of the technology described in this application.

Method or algorithm steps described in combination with the content disclosed in this application may be implemented by hardware, or may be implemented by a processor by executing software instructions. The software instructions may include a corresponding software module. The software module may be stored in a RAM memory, a flash memory, a ROM memory, an EPROM memory, an EEPROM memory, a register, a hard disk, a removable hard disk, a CD-ROM, or a storage medium in any other form well-known in the art. For example, the storage medium is coupled to the processor, so that the processor can read information from the storage medium and write information into the storage medium. Certainly, the storage medium may be a component of the processor. The processor and the storage medium may be located in an ASIC. In addition, the ASIC may be located in a terminal. Certainly, the processor and the storage medium may alternatively exist in the optical line termination apparatus as discrete components.

Figure 10:
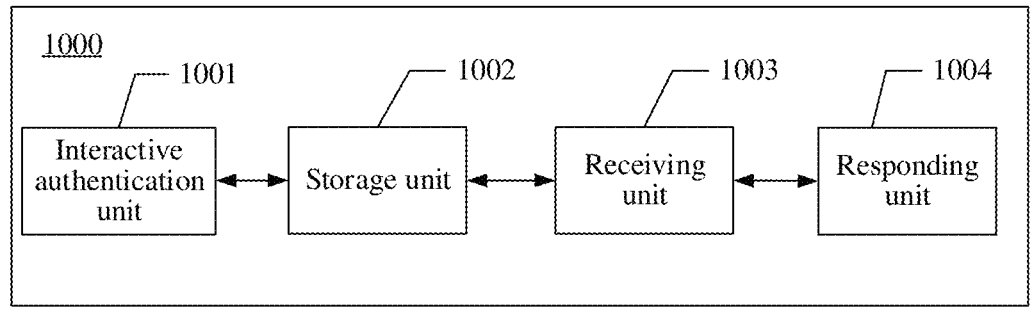
FIG. 10 is a schematic diagram of an embodiment of an optical module apparatus according to an embodiment of this application.

For details, refer to FIG. 10. In this embodiment of this application, an optical module apparatus 1000 includes an interactive authentication unit 1001, a storage unit 1002, a receiving unit 1003, and a responding unit 1004. The interactive authentication unit 1001, the storage unit 1002, the receiving unit 1003, and the responding unit 1004 are connected through a bus. The optical module apparatus 1000 may be the optical module in the foregoing method embodiments, or may be configured as one or more chips in the optical module. The optical module apparatus 1000 may be configured to perform some or all functions of the optical module in the foregoing method embodiments. In addition, FIG. 10 shows only some modules of the optical module apparatus that are related to this embodiment of this application.

For example, the interactive authentication unit 1001 is configured to perform interactive authentication with an optical line termination OLT to determine a time sequence parameter. The storage unit 1002 is configured to store the time sequence parameter in a register of the optical module apparatus. The receiving unit 1003 is configured to receive a read instruction of the OLT when the apparatus is inserted into the OLT and is a working state. The responding unit 1004 is configured to respond to the read instruction of the OLT, and transmit the time sequence parameter to the OLT.

Optionally, the storage unit 1002 may store execution instructions. In this case, the storage unit 1002 is coupled to the processing unit, so that the processing unit is enabled to execute the computer execution instructions stored in the storage unit, to implement a function of the optical module in the foregoing method embodiments. In an example, the storage unit optionally included in the optical module apparatus 1000 may be a storage unit in a chip, for example, a register or a cache. The storage unit may alternatively be a storage unit, for example, a ROM, another type of static storage device that can store static information and instructions, or a RAM, that is outside the chip.

It should be understood that a procedure performed between modules of the optical module in the embodiment corresponding to FIG. 10 is similar to a procedure performed by the optical module in the method embodiments corresponding to FIG. 6 and FIG. 7. Details are not described herein again.

Figure 11:
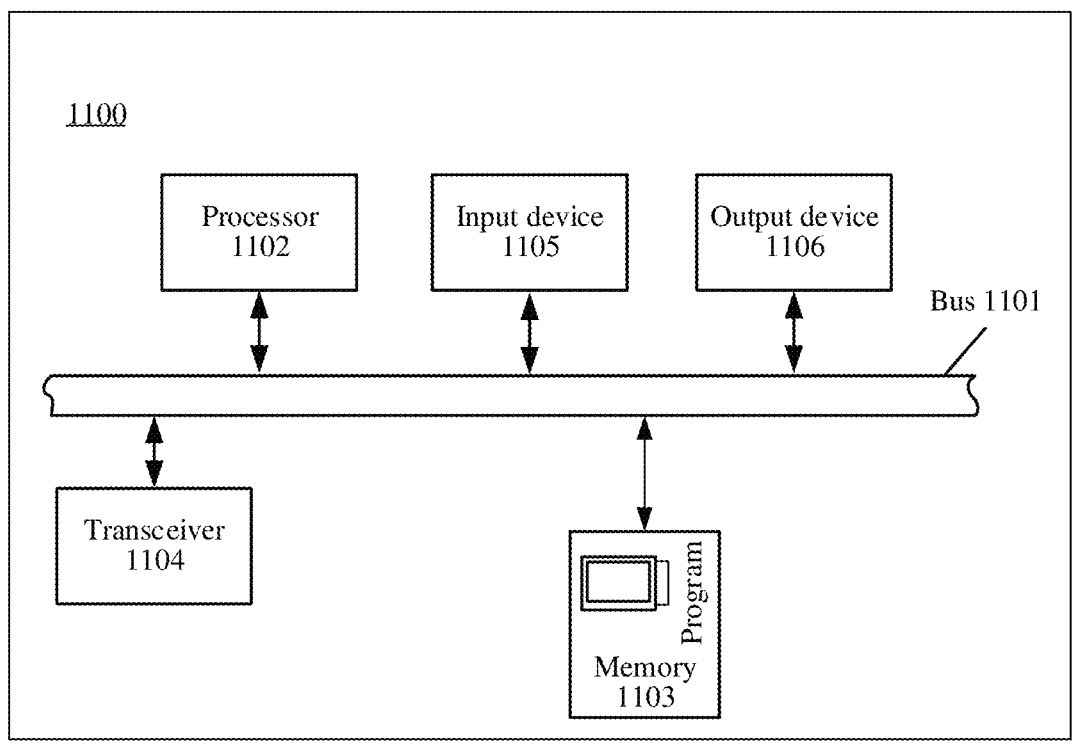
FIG. 11 is a schematic diagram of another embodiment of an optical module apparatus according to an embodiment of this application.

FIG. 11 is a schematic diagram of a possible structure of an optical module apparatus 1100 in the foregoing embodiments. The optical module apparatus 1100 may be configured as the foregoing optical module. The optical module apparatus 1100 may include a processor 1102, a computer-readable storage medium/memory 1103, a transceiver 1104, an input device 1105, an output device 1106, and a bus 1101. The processor, the transceiver, the computer-readable storage medium, and the like are connected through the bus. A specific connection medium between the foregoing components is not limited in this embodiment of this application.

In an example, the transceiver 1104 performs interactive authentication with the optical line termination OLT. The processor 1102 determines the time sequence parameter. The memory 1103 stores the time sequence parameter. The transceiver 1104 receives the read instruction of the OLT when the apparatus is inserted into the OLT and is in the working state, responds to the read instruction of the OLT, and transmits the time sequence parameter to the OLT.

The transceiver 1104, the processor 1102, and the memory 1103 may implement corresponding steps in either of the embodiments in FIG. 6 and FIG. 7. Details are not described herein again.

It may be understood that FIG. 11 shows only a simplified design of the optical module apparatus. In actual application, the optical module apparatus may include any quantity of transceivers, processors, memories, and the like. All optical module apparatuses that can implement this application fall within the protection scope of this application.

The processor 1102 in the apparatus 1100 may be a general-purpose processor, for example, a CPU, a network processor (NP), or a microprocessor, or may be an ASIC, or one or more integrated circuits configured to control program execution of the solutions in this application. Alternatively, the processor 1102 may be a digital signal processor (DSP), a field-programmable gate array (FPGA) or another programmable logic device, a discrete gate or a transistor logic device, or a discrete hardware component. Alternatively, a controller/processor may be a combination of processors implementing a computing function, for example, a combination of one or more microprocessors, or a combination of the DSP and the microprocessor. The processor usually performs logical and arithmetic operations based on program instructions stored in the memory.

The bus 1101 described above may be a peripheral component interconnect (peripheral component interconnect, PCI for short) bus, an extended industry standard architecture (EISA) bus, or the like. The bus may be classified into an address bus, a data bus, a control bus, and the like. For ease of representation, only one thick line is used to represent the bus in FIG. 11, but this does not mean that there is only one bus or only one type of bus.

The computer-readable storage medium/memory 1103 may further store an operating system and another application program. Specifically, the program may include program code, and the program code includes computer operation instructions. More specifically, the memory may be a ROM, another type of static storage device that can store static information and instructions, a RAM, another type of dynamic storage device that can store information and instructions, a magnetic disk memory, or the like. The memory 1103 may be a combination of the foregoing storage types. In addition, the computer-readable storage medium/memory may be located in the processor, may be located outside the processor, or may be distributed in a plurality of entities including the processor or a processing circuit. The computer-readable storage medium/memory may be specifically embodied in a computer program product. For example, the computer program product may include a computer-readable medium in a packaging material.

Alternatively, embodiments of this application further provide a universal processing system. For example, the universal processing system is usually referred to as a chip. The universal processing system includes one or more microprocessors that provide a processor function, and an external memory that provides at least a part of the storage medium. All these components are connected to another supporting circuit by using an external bus architecture. When instructions stored in the memory are executed by the processor, the processor is enabled to perform some or all of the steps of the time sequence information configuration method performed by the optical line termination apparatus in the embodiments of FIG. 6 and FIG. 7, and/or another process of the technology described in this application.

Method or algorithm steps described in combination with the content disclosed in this application may be implemented by hardware, or may be implemented by a processor by executing software instructions. The software instructions may include a corresponding software module. The software module may be stored in a RAM memory, a flash memory, a ROM memory, an EPROM memory, an EEPROM memory, a register, a hard disk, a removable hard disk, a CD-ROM, or a storage medium in any other form well-known in the art. For example, the storage medium is coupled to the processor, so that the processor can read information from the storage medium and write information into the storage medium. Certainly, the storage medium may be a component of the processor. The processor and the storage medium may be located in an ASIC. In addition, the ASIC may be located in a terminal. Certainly, the processor and the storage medium may alternatively exist in the optical module apparatus as discrete components.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, or each unit may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. An optical line termination (OLT), comprising:
   at least one processor; and
   a memory coupled to the at least one processor, the memory storing instructions that are executable by the at least one processor, the instructions including instructions for controlling the OLT to:
   read a time sequence parameter stored in an optical module corresponding to the OLT;
   determine, based on the time sequence parameter, time sequence information corresponding to the optical module, wherein the time sequence information comprises at least one of burst total overhead data, a preamble length, or a reset signal location; and
   configure the time sequence information for an optical network unit (ONU) corresponding to the optical module.

2. The OLT according to claim 1, wherein the time sequence parameter is determined through interactive authentication performed by the optical module with the OLT.

3. The OLT according to claim 1, wherein the time sequence parameter is stored in a register address preset in a protocol.

4. The OLT according to claim 1, wherein the instructions include instructions for controlling the OLT to:
   read, through a management channel, the time sequence parameter stored in the optical module.

5. The OLT according to claim 1, wherein the time sequence information comprises the burst total overhead data, the preamble length, and the reset signal location.

6. The OLT according to claim 1, wherein the instructions further include instructions for controlling the OLT to:
   exchange data with the ONU based on the time sequence information.

7. An optical module, comprising:
   at least one processor; and
   a memory coupled to the at least one processor, the memory storing instructions that are executable by the at least one processor, the instructions including instructions for controlling the optical module to:
   perform interactive authentication with an optical line termination (OLT) to determine a time sequence parameter;
   store the time sequence parameter in a register of the optical module;
   receive a read instruction of the OLT when the optical module is inserted into the OLT and is in a working state; and
   respond to the read instruction of the OLT by transmitting the time sequence parameter to the OLT.

8. The optical module according to claim 7, wherein the time sequence parameter is used to determine time sequence information corresponding to the optical module, and the time sequence information comprises burst total overhead data, a preamble length, and a reset signal location.

9. The optical module according to claim 7, wherein the instructions include instructions for controlling the optical module to:
   respond to the read instruction of the OLT by transmitting the time sequence parameter to the OLT through a management channel.

10. An optical communication system, comprising:
    an optical line termination apparatus (OLT);
    an optical module corresponding to the OLT; and
    an optical network unit (ONU);
    wherein the OLT is configured to:
    read a time sequence parameter stored in the optical module;
    determine, based on the time sequence parameter, time sequence information corresponding to the optical module, wherein the time sequence information comprises at least one of burst total overhead data, a preamble length, or a reset signal location; and
    configure the time sequence information for the ONU corresponding to the optical module.

11. The optical communication system according to claim 10, wherein the time sequence parameter is determined through interactive authentication performed by the optical module with the OLT.

12. The optical communication system according to claim 10, wherein the time sequence parameter is stored in a register address preset in a protocol.

13. The optical communication system according to claim 10, wherein the OLT is configured to:
    read, through a management channel, the time sequence parameter stored in the optical module.

14. The optical communication system according to claim 10, wherein the time sequence information comprises the burst total overhead data, the preamble length, and the reset signal location.

15. The optical communication system according to claim 10, wherein the OLT is further configured to:
    exchange data with the ONU based on the time sequence information.

16. The optical communication system according to claim 10, wherein the optical module is configured to:
    perform interactive authentication with the OLT to determine the time sequence parameter;
    store the time sequence parameter in a register of the optical module;
    receive a read instruction of the OLT when the optical module is inserted into the OLT and is in a working state; and respond to the read instruction of the OLT by transmitting the time sequence parameter to the OLT.

17. The optical communication system according to claim 16, wherein the time sequence information comprises the burst total overhead data, the preamble length, and the reset signal location.

18. The optical communication system according to claim 10, wherein the optical module is configured to:
respond to a read instruction of the OLT by transmitting the time sequence parameter to the OLT through a management channel.

* * * * *